(12) United States Patent
Holtzman

(10) Patent No.: US 11,081,848 B2
(45) Date of Patent: Aug. 3, 2021

(54) CHARGER EXTENSION DEVICE

(71) Applicant: John Holtzman, St. Louis, MO (US)

(72) Inventor: John Holtzman, St. Louis, MO (US)

( * ) Notice: Subject to any disclaimer, the term of this patent is extended or adjusted under 35 U.S.C. 154(b) by 0 days.

(21) Appl. No.: 16/659,754

(22) Filed: Oct. 22, 2019

(65) Prior Publication Data

US 2021/0119394 A1 Apr. 22, 2021

(51) Int. Cl.
*H01R 31/02* (2006.01)
*H01R 27/02* (2006.01)
*H01R 13/639* (2006.01)
*H02J 7/00* (2006.01)

(52) U.S. Cl.
CPC .......... *H01R 31/02* (2013.01); *H01R 13/639* (2013.01); *H01R 27/02* (2013.01); *H02J 7/00* (2013.01); *H02J 7/0045* (2013.01)

(58) Field of Classification Search
CPC ...... H01R 31/06; H01R 31/02; H01R 23/025; H01R 23/7073; H01R 23/02; H01R 13/5833; H01R 13/5829; H01R 13/639; H01R 27/02; H02J 7/0045; H02J 7/00
USPC ........ 439/502, 638, 660, 446, 456–459, 534
See application file for complete search history.

(56) References Cited

U.S. PATENT DOCUMENTS

| | | | | |
|---|---|---|---|---|
| 5,921,805 A * | 7/1999 | Tabata | ............... | H01R 13/5804 439/457 |
| 6,010,356 A * | 1/2000 | Hale | .................... | H01R 4/2433 439/419 |
| 6,113,421 A * | 9/2000 | Daoud | ................. | H01R 4/2433 439/409 |
| 6,152,759 A * | 11/2000 | Daoud | ................. | H01R 4/2433 439/409 |
| 6,305,962 B1 | 10/2001 | Maher et al. | | |
| 6,315,599 B1 * | 11/2001 | Daoud | ............... | H01R 13/5829 439/459 |
| 6,338,650 B1 * | 1/2002 | Dong | .................... | H01R 12/88 439/534 |
| 7,011,538 B2 | 3/2006 | Chang | | |
| 8,070,507 B1 * | 12/2011 | Liang | ................... | H01R 13/562 439/446 |
| 9,077,794 B2 * | 7/2015 | Narendra | ............ | H04M 1/0274 |
| 9,166,281 B2 * | 10/2015 | Narendra | .............. | H02J 7/0042 |
| 9,520,684 B2 * | 12/2016 | Narendra | ............. | H01R 13/665 |
| 9,590,437 B2 * | 3/2017 | Levy | .................... | H02J 2207/40 |
| 9,744,867 B1 | 8/2017 | Shen | | |
| 2004/0203279 A1 * | 10/2004 | Olle Miquel | ........... | H02G 3/10 439/534 |
| 2013/0309901 A1 * | 11/2013 | Hilbourne | ............. | G06F 1/1632 439/502 |
| 2014/0273613 A1 * | 9/2014 | Mcsweyn | .............. | H01R 27/00 439/518 |
| 2014/0273644 A1 * | 9/2014 | Mcsweyn | .............. | H01R 31/06 439/628 |

(Continued)

*Primary Examiner* — Gary F Paumen
(74) *Attorney, Agent, or Firm* — David H. Chervitz

(57) ABSTRACT

A charger extension device has a housing having a top side, a left side, a bottom side, a right side, a rear side, and a front side, an USB port on the front side of the housing, and a Lightning port on the rear side of the housing. Another charger extension device has a housing having a top side, a left side, a bottom side, a right side, a rear side, and a front side, an USB port on the front side of the housing, a cable retention assembly on the front side of the housing, and a Lightning port on the rear side of the housing.

20 Claims, 8 Drawing Sheets

(56) References Cited

U.S. PATENT DOCUMENTS

| | | | |
|---|---|---|---|
| 2015/0207286 A1* | 7/2015 | Chen | H04M 1/04 |
| | | | 439/639 |
| 2015/0263513 A1* | 9/2015 | Newell | H02H 7/228 |
| | | | 361/111 |
| 2016/0006185 A1* | 1/2016 | Greig | H01R 27/02 |
| | | | 439/620.21 |
| 2016/0020557 A1* | 1/2016 | Daoura | H01R 13/502 |
| | | | 439/38 |
| 2016/0118755 A1* | 4/2016 | Chen | H01R 13/717 |
| | | | 439/620.21 |
| 2016/0118758 A1* | 4/2016 | Cymerman | H01R 13/64 |
| | | | 439/39 |
| 2016/0149353 A1* | 5/2016 | Chen | H01R 13/6675 |
| | | | 439/490 |
| 2016/0365749 A1 | 12/2016 | Lin | |
| 2017/0070007 A1* | 3/2017 | Lee | H01R 27/02 |
| 2018/0366954 A1* | 12/2018 | Scanzillo | H01R 13/6691 |
| 2019/0148885 A1* | 5/2019 | Cyzen | H01R 31/06 |
| | | | 439/373 |
| 2019/0317134 A1* | 10/2019 | Rawls | G01R 15/12 |

* cited by examiner

CHARGER EXTENSION DEVICE

BACKGROUND

This disclosure relates to a charger device and more particularly to a charger extension device that allows a battery operated device to be charged a distance from an electrical outlet.

Various battery operated mobile devices, such as laptops, cell phones, tablets, and media devices, are in use today. Although batteries provide power to such devices, batteries are limited in how long power can be provided. As such, the batteries associated with these devices need to be charged and recharged. When purchasing these devices, the manufacturer typically provides a charger unit and a cable for charging the batteries associated with these devices. The charger unit is inserted into a wall outlet and the cable is connected between the charger unit and the battery operated device. The charger unit transforms the AC (alternating current) voltage to a much lower DC (direct current) voltage for charging the battery. However, the cable provided only has a predetermined length which is usually very short. If a device needs to be charged farther away from the charger unit then either a longer cable must be used or an extension cord must be used. However, it does not appear that such longer cables exist. Also, use of an extension cord may not be safe because the cord is prone to being tripped over and removed from a wall outlet or from the battery operated device. The could damage the wall outlet, the cord, and the battery operated device.

Therefore, there is a need for a charger extension device that allows a battery operated device to be charged a distance from a wall outlet. There is also a need for a charger extension device which prevents a cable connected to the charger extension device from being removed from the battery operated device that is being charged.

The present disclosure is designed to obviate and overcome many of the disadvantages and shortcomings associated with charging a battery operated device a distance from a wall outlet or power source. In particular, the present disclosure provides a charger extension device that charges a battery operated device a distance from a wall outlet. It would also be advantageous to have a charger extension device that is not complex and is easy to use in order to be able to charge a battery operated device a distance from a wall outlet. Further, it would be advantageous to provide a charger extension device that prevents a cable from being accidentally removed from the charger extension device during a charging operation.

SUMMARY

In one form of the present disclosure, a charger extension device comprises charger extension device has a housing having a top side, a left side, a bottom side, a right side, a rear side, and a front side, an USB (Universal Serial Bus) port on the front side of the housing, and a Lightning port on the rear side of the housing.

In another form of the present disclosure, a charger extension device comprises a housing having a top side, a left side, a bottom side, a right side, a rear side, and a front side, an USB port on the front side of the housing, a cable retention assembly on the front side of the housing, and a Lightning port on the rear side of the housing.

In yet another form of the present disclosure, a charger extension device comprises a housing having a top side, a left side, a bottom side, a right side, a rear side, and a front side, an USB port on the front side of the housing, a Lightning port on the rear side of the housing, and an L shaped stand for positioning on the right side of the housing and the bottom side of the housing.

In light of the foregoing comments, it will be recognized that the present disclosure provides a charger extension device that may be used to charge a battery a far distance from an electrical outlet.

The present disclosure provides a charger extension device which can be easily employed and operated with highly reliable results.

The present disclosure is also directed to a charger extension device that is capable of charging various devices or batteries.

The present disclosure also provides a charger extension device which includes one or more USB ports.

The present disclosure provides a charger extension device that is capable of being used to charge a phone, such as a smart phone, and can be easily operated without the use of any specialized equipment.

The present disclosure also provides a charger extension device that be placed a distance from an electrical outlet for charging a phone that is also positioned a distance from the electrical outlet.

The present disclosure provides a charger extension device that is employed to charge multiple devices which are located at various distances from an electrical outlet.

The present disclosure is directed to a charger extension device in which the charger extension device may be connected to a phone even when the phone is operating.

The present disclosure is further directed to a charger extension device having a retention device for securing a cable or a connector to the charger extension device.

The present disclosure also provides a charger extension device having a number of retention devices for securing each cable or connector connected to the charger extension device.

The present disclosure further provides a charger extension device having a multi positioned stand for positioning the charger extension device in various positions or orientations.

The present disclosure is also directed to a charger extension device that is capable of charging a battery a far distance from an alternating current (AC) wall outlet.

The present disclosure is further directed to a charger extension device that may be connected to another charger extension device to provide for charging a battery operated device at an even further distance from an AC wall outlet.

These and other applications and advantages of the present disclosure will become apparent after considering the following detailed specification in conjunction with the accompanying drawings, wherein

DETAILED DESCRIPTION OF AN EMBODIMENT

Figure 1:
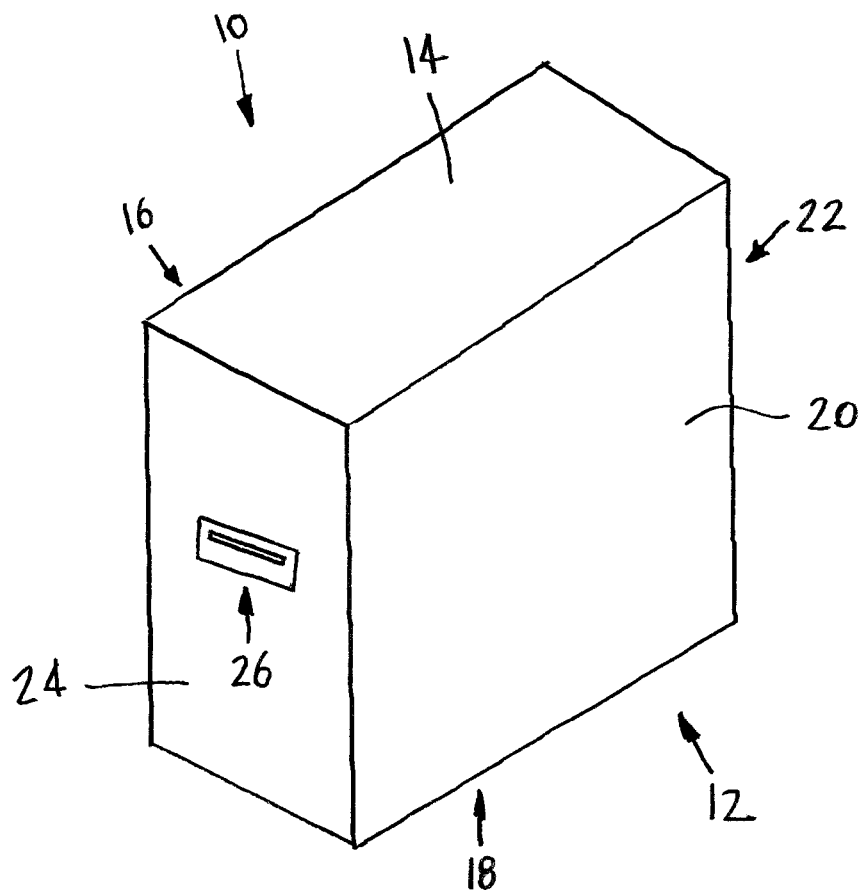
FIG. 1 is a front perspective view of a charger extension device constructed according to the present disclosure.

Referring now to the drawings, wherein like numbers refer to like items, number 10 identifies an embodiment of a charger extension device constructed according to the present disclosure. With reference now to FIG. 1, the charger extension device 10 is shown comprising a device housing 12 having a top side 14, a left side 16, a bottom side 18, a right side 20, a rear side 22, and a front side 24 having an USB (Universal Serial Bus) port 26. Although the USB port 26 is shown, it is possible that the port may be an USB-B, an USB-C, a Mini-USB, or a Micro-USB type, as required by the particular application.

Figure 2:
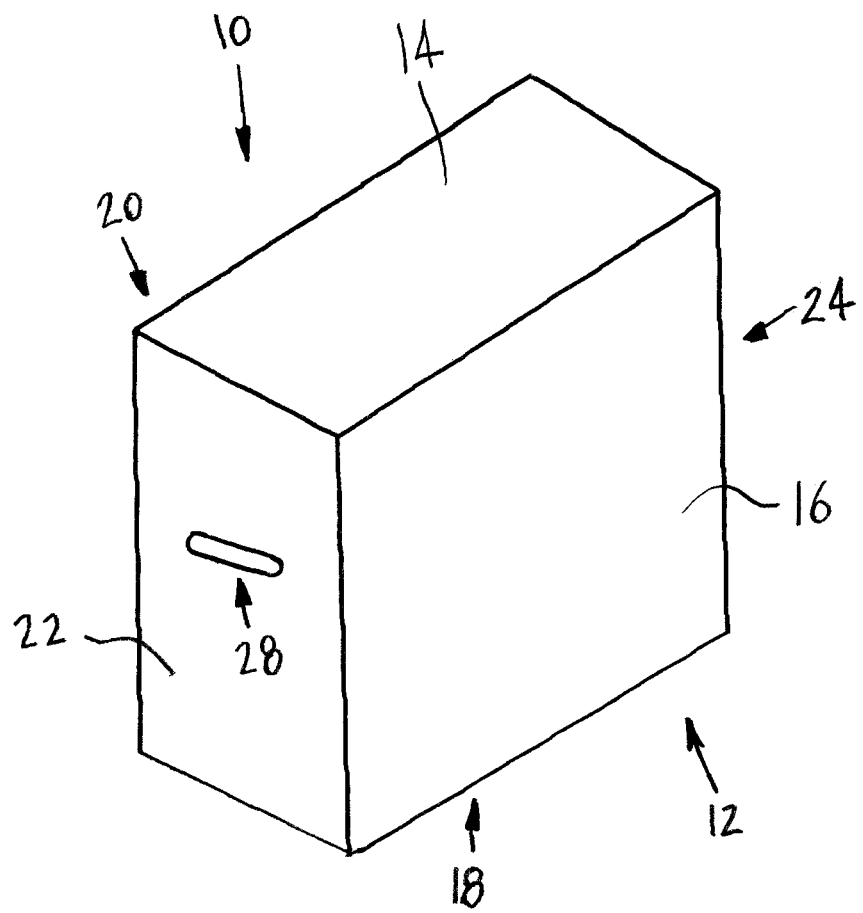
FIG. 2 is a rear perspective view of the charger extension device constructed according to the present disclosure.

FIG. 2 shows a rear or back view of the charger extension device 10 constructed according to the present disclosure. The charger extension device 10 is shown to have the device housing 12 having the top side 14, the left side 16, the bottom side 18, the right side 20, the front side 24, and the rear side 22 having a Lightning port 28. Although the Lightning port 28 is shown, it is possible that the port may be any other port, such as another USB port, as may be required by the particular application. Lightning is a registered trademark owned by Apple Inc. of Cupertino, Calif.

Figure 3:
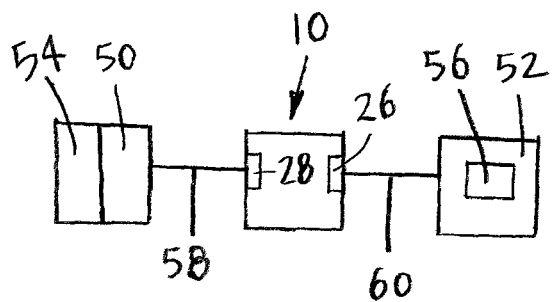
FIG. 3 is a schematic block diagram of the charger extension device connected between a wall outlet and a battery operated device.

With reference now to FIG. 3, a block diagram of the charger extension device 10 connected to a charger device 50 and a battery operated device 52 is illustrated. The charger device 50, may be way of example only, a charger device that is sold with a smart phone that is used to charge the smart phone. The charger device 50 is connected to a wall outlet 54, such as a 120 VAC wall outlet found in a residence or commercial building. The wall outlet 54 provides power to the charger device 50 which in turn transforms the AC voltage to a lower DC voltage that is used to charge a battery 56 associated with the device 52. A first cable 58 is connected between the charger device 50 and into the Lightning port 28 of the charger extension device 50. The first cable 58 is usually provided with the charger device 50 and has an USB connector end that is connected to the charger device 50 and a Lightning connector end that is connected to the battery operated device 52. Although not shown in any detail, the charger device 50 has an USB port for receiving the USB connector end of the first cable 58. A second cable 60 is connected between the USB port 26 of the charger extension device 10 and the battery operated device 52. Further, again not shown in any detail is that the device 52 has a Lightning port in which the Lightning end connector of the second cable 60 is inserted. The second cable 60 will typically be similar to the first cable 58 in that one end will have a Lightning connector end and the other end will have an USB connector end. Once connected in this manner the charger extension device 10 is capable of providing power from the wall outlet 54, the charger device 50, the first cable 58, the charger extension device 10, and the second cable 60 to charge the battery 56 in the battery operated device 52. Also, it should be recognized that the second cable 60 may be any length and will typically be a length that is larger than the length of the first cable 58 that was initially provided with the device 52.

Figure 4:
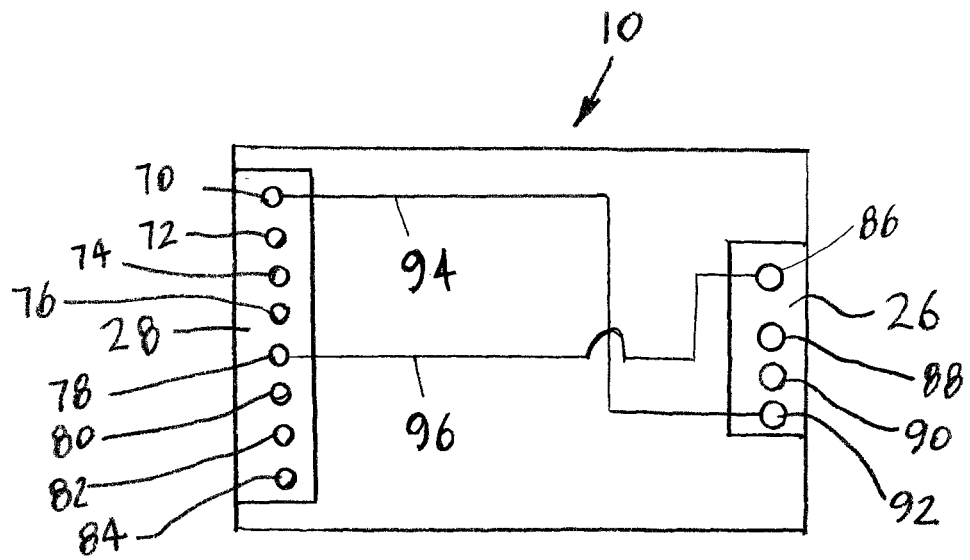
FIG. 4 is a schematic diagram of the charger extension device constructed according to the present disclosure.

FIG. 4 depicts a schematic diagram of the charger extension device 10. The charger extension device 10 has the Lightning port 28 which has eight pin connections 70, 72, 74, 76, 78, 80, 82, and 84. The pin connector 70 is ground and the pin connector 78 is for power. The other pin connections 72, 74, 76, 80, 82, and 84 are not used in this particular application. The USB port 26 has four pin connections 86, 88, 90, and 92. The pin connection 86 is for power and the pin connection 92 is for ground. The pin connection 70 of the Lightning port 28 is connected to the pin connection 92 of the USB port 26 via a wire 94. The pin connection 78 of the Lightning port 28 is connected to the pin connection 86 of the USB port 26 via a wire 96. With reference again to FIG. 3, in this manner, power is provided from the charger device 50 through the cable 58, through the charger extension device 10, through the cable 60, and to the battery 56 of the device 52 to charge the battery 56 a distance from the wall outlet 54. As can be appreciated, connections 88 and 90 of the USB port 26 are not used. Although not shown, it is possible and contemplated to include within the device 10 between the ports 26 and 28 various other circuits such as, by way of example only, an over voltage protection circuit, an LED (light emitting diode) light to indicate that power is being provided, and a quick charger circuit or chip.

Figure 5:
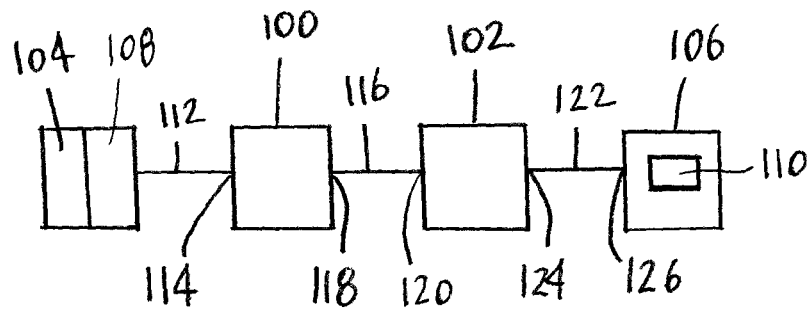
FIG. 5 is a schematic block diagram of a pair of charger extension devices connected between a wall outlet and a battery operated device.

With particular reference now to FIG. 5, a pair of charger extension devices 100 and 102 illustrate how the devices 100 and 102 can be used to further extend the distance from a wall outlet 104 to a battery operated device 106 to be charged. The charger extension devices 100 and 102 are the same as the charger extension device 10. A charger device 108 is connected to the wall outlet 104, such as a 120 VAC wall outlet found in a residence or commercial building. The wall outlet 104 provides power to the charger device 108 which in turn transforms the AC voltage to a lower DC voltage that is used to charge a battery 100 within with the device 106. A first cable 112 is connected between the charger device 108 and into a Lightning port 114 of the charger extension device 100. The first cable 112 is usually provided with the charger device 108 and has an USB connector end that is connected to the charger device 108 and a Lightning connector end that is connected to the Lightning port 114 of the first charger extension device 100. A second cable 116 is connected between the first charger extension device 100 and the second charger extension device 102. The second cable 116 is similar to the first cable 112 in that the second cable 116 has a Lightning connector end and an USB connector end. As can be appreciated, the USB connector end is inserted into an USB port 118 associated with the first charger extension device 100 and the Lightning connector end is inserted into a Lightning port 120 associated with the second charger extension device 102. A third cable 122 is connected between the second charger extension device 102 and the battery operated device 106. The third cable 122 is similar to the first cable 112 and the second cable 116 in that the third cable 122 also has an USB connector end and a Lightning connector end. The USB connector end is connected to an USB port 124 of the second charger extension device 102 and the Lightning connector end is connected to a Lightning port 126 of the device 106. Power is provided from the wall outlet 104 through the charger device 108, the first cable 112, the first charger extension device 100, the second cable 116, the second charger extension device 102, and the third cable 122 to charge the battery 110 resident in the battery operated device 106. As can be appreciated, with the use of the two charger extension devices 100 and 102, the device 106 may be charged a further distance from the wall outlet 104. Further, although two charger extension devices 100 and 102 are discussed in this particular embodiment, it is possible that more charger extension devices, such as devices 100 or 102, may be used to further the distance between the wall outlet 104 and the battery operated device 106.

Figure 6:
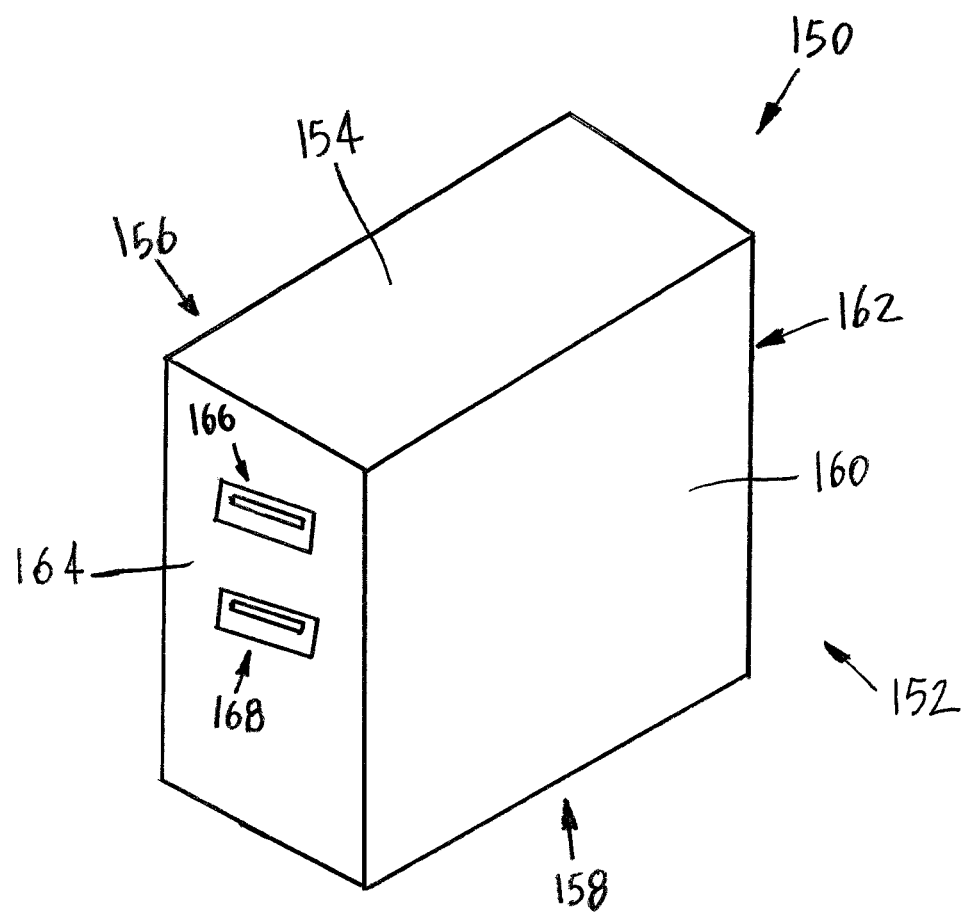
FIG. 6 is a front perspective view of another embodiment of a charger extension device constructed according to the present disclosure.

FIG. 6 shows another embodiment of a charger extension device 150 constructed according to the present disclosure. The charger extension device 150 comprises a device housing 152 having a top side 154, a left side 156, a bottom side 158, a right side 160, a rear side 162, and a front side 164 having a first USB port 166 and a second USB port 168. Although the USB port 166 and 168 are shown, it is possible that the ports 166 and 168 may be an USB-B, an USB-C, a Mini-USB, or a Micro-USB type, as required by the particular application. The charger extension device 150 may be used to charge two separate battery operated devices. It is also possible that there may be more than the two ports 166 and 168 shown. By way of example, there may be four USB ports on the front side 164. Although not shown, there is a Lightning port positioned on the rear side 162 which is used to receive a cable having a Lightning end connector.

Figure 7:
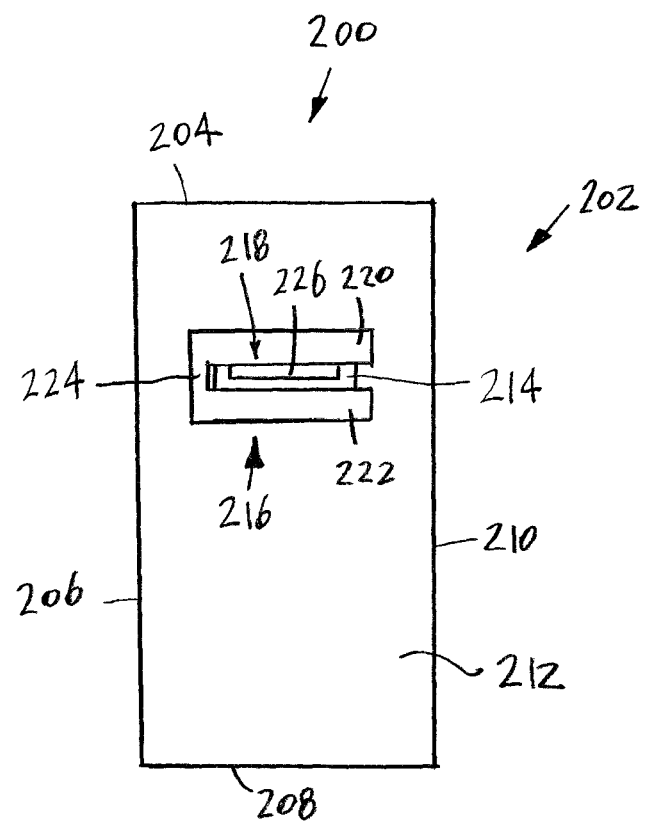
FIG. 7 is a front view of another embodiment of a charger extension device constructed according to the present disclosure.

With particular reference now to FIG. 7, another embodiment of a charger extension device 200 is illustrated. The charger extension device 200 comprises a device housing 202 having a top side 204, a left side 206, a bottom side 208, a right side 210, and a front side 212 having an USB port 214 and a cable retention assembly 216. The cable retention assembly 216 has a generally U-shaped body 218 having a first leg 220, a second leg 222, and a central portion 224. A slot 226 is formed between the legs 220 and 222. Although not shown in this particular view, the device housing 202 also has a rear side having a Lightning port. The cable retention assembly 216 is used to retain a cable, such as the cable 60 (FIG. 3), in place during use of the charger extension device 200. The cable retention assembly 216 is shown in a closed position. As can be appreciated, the cable retention assembly 216 retains a cable in place during use so that the cable will not be removed from the USB port 214 during a charging operation. Further, although not shown, it is possible that another cable retention assembly may be positioned on the rear side over a Lightning port. In this manner the cable retention assembly may retain a cable, such as the cable 58 (FIG. 3), in place during use of the device 200.

Figure 8:
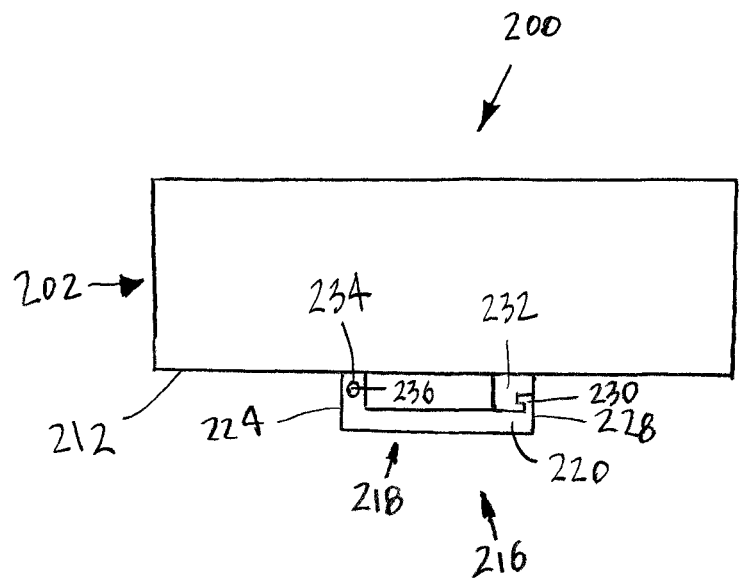
FIG. 8 is an enlarged top view of a cable retention assembly shown in FIG. 7 constructed according to the present disclosure.

FIG. 8 shows an enlarged top view of the cable retention assembly 216 in a closed position on the charger extension device 200. The cable retention assembly 216 has the body 218, the first leg 220, and the central portion 224. The first leg 220 has an end 228 having a recessed or hook portion 230. A recessed receiving portion or a catch 232 is positioned on the front side 212 of the body 202 of the device 200. The catch 232 is used to retain the hook portion 230 to lock the body 218 in place and to retain a cable (not shown) in place. An aperture 234 is formed in the central portion 224 and is used to receive a pivot pin 236. The pivot pin 236 allows the cable retention assembly 216 to be opened or closed. Although not shown in this figure, the second leg 222 may have a similar retention structure.

Figure 9:
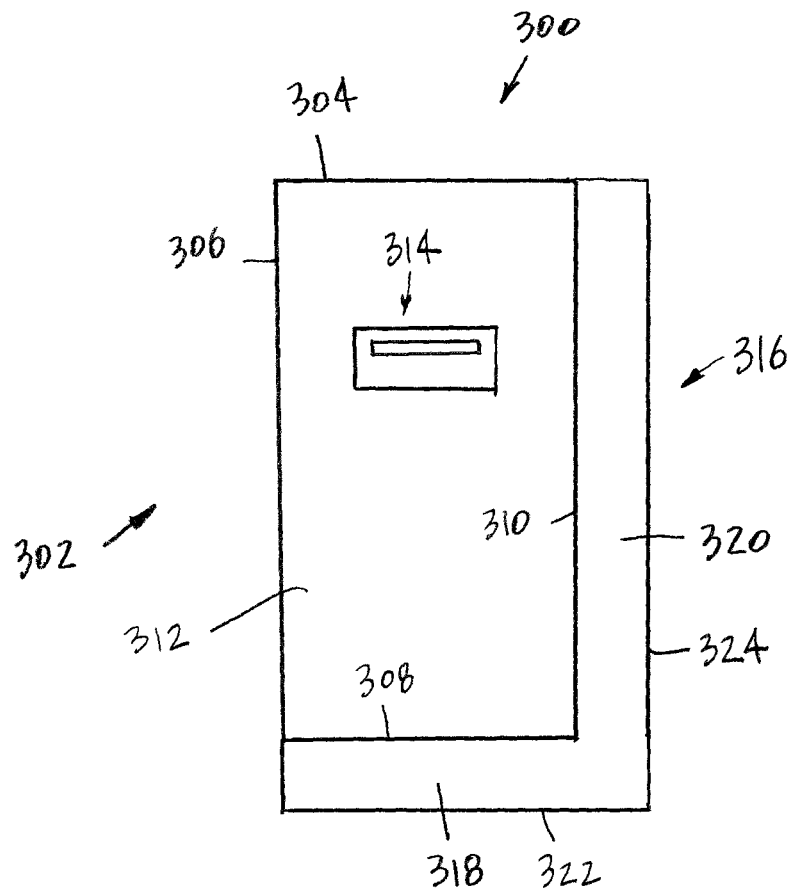
FIG. 9 is a front perspective view of another embodiment of a charger extension device having a stand device constructed according to the present disclosure.

Referring now to FIG. 9, another embodiment of a charger extension device 300 constructed according to the present disclosure is depicted. The charger extension device 300 comprises a device housing 302 having a top side 304, a left side 306, a bottom side 308, a right side 310, and a front side 312 having an USB port 314. Not shown in this particular view is a rear side in which a Lightning port is provided. The charger extension device 300 also has a generally L-shaped stand device 316 that is positioned on the bottom side 308 and the right side 310. The stand device 316 has a bottom leg 318 and a side leg 320. The bottom leg 318 has a bottom leg edge or surface 322 and the side leg 320 has a side leg edge or surface 324. The bottom leg edge 322 allows the device 300 to be positioned in an upright orientation. The side leg edge 324 allows the device 300 to be positioned in a sideways orientation. Although one stand device 316 is shown it is possible that more than one stand device 316 may be used to further support and orientate the charger extension device 300. Further, it is contemplated that the front side 312 may also include the cable retention assembly 216 (FIG. 7).

Figure 10:
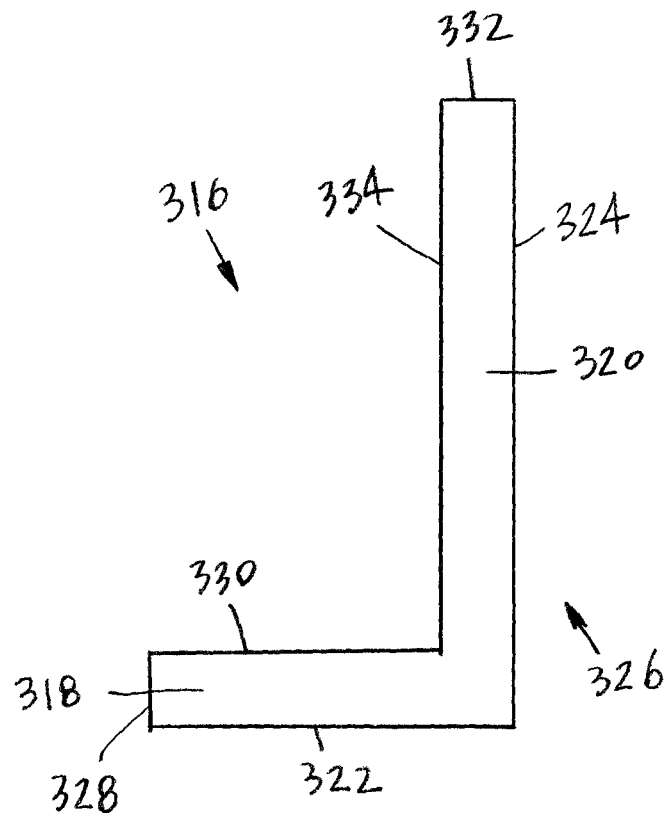
FIG. 10 is a front perspective view of the stand device being removed from the charger extension device shown in FIG. 9.

FIG. 10 shows the stand device 316 removed from the charger extension device 300. The stand device 316 comprises the bottom leg 318 and the side leg 320 which form a generally L-shaped body 326. The bottom leg 318 has the bottom leg edge 322, an end edge or side 328, and a bottom engaging edge or surface 330. The bottom engaging edge 330 is used to engage the bottom side 308 (FIG. 9) of the charger extension device 300. The side leg 320 has the side leg edge 324, a top edge or side 332, and a side engaging edge or surface 334. The side engaging edge 334 is used to engage the right side 310 (FIG. 9) of the charger extension device 300.

Figure 11:
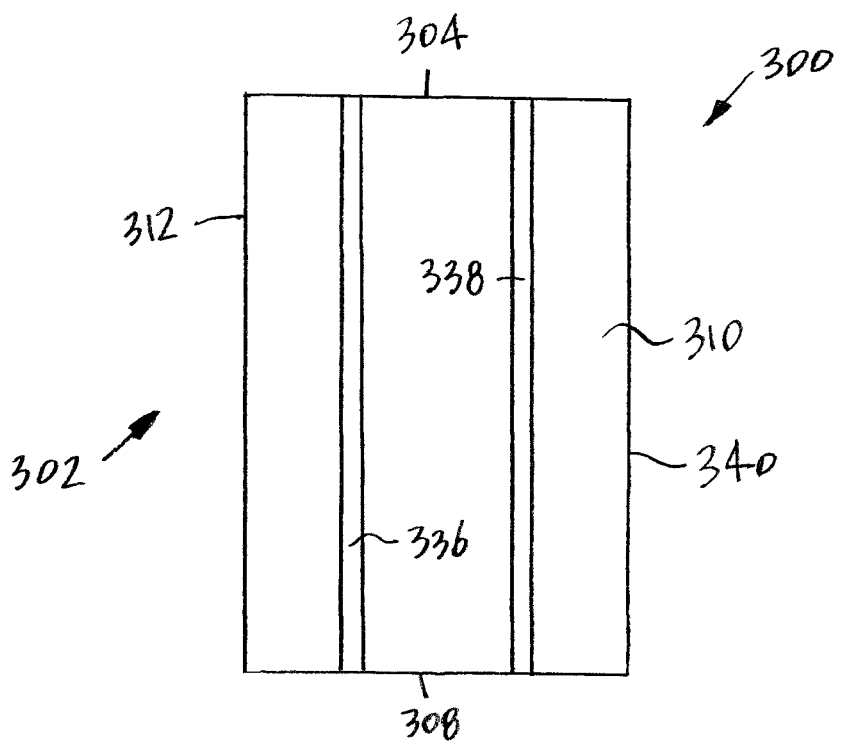
FIG. 11 is a side view of the charger extension device shown in FIG. 9 with the stand device being removed.

With reference now to FIG. 11, a side view of the charger extension device 300 shown in FIG. 9 with the stand device 316 being removed and the right side 310 being exposed. The right side 310 has a first groove or slot 336 and a second groove or slot 338 formed therein. The grooves 336 and 338 are used to capture and retain the side engaging edge 334 (FIG. 10) of the stand device 316. The edge 334 may be inserted into the groove 336 and the stand device 316 is retained in place along the right side 310. Although two grooves 336 and 338 are illustrated, it should be recognized that more grooves may be formed in the right side 310. It is also possible that corresponding grooves or slots may be formed in the bottom side 308 (FIG. 9) of the charger extension device 300 for engaging and retaining the bottom engaging edge 330 (FIG. 10) of the stand device 316. By use of the grooves 336 and 338 the stand device 316 may be locked into place along the right side 310 of the charger extension device 300. The grooves 336 and 338 extend from the bottom side 308 to the top side 304. Also, a rear side 340 of the charger extension device 300 is shown. As has been indicated above, the rear side may have a Lightning port.

The charger extension devices 10, 100, 102, 150, 200, and 300 may be constructed of readily available components. The charger extension devices 10, 100, 102, 150, 200, and 300 may sold as part of a kit that may include items such as one or more of the charger devices 10, 100, 102, 150, 200, and 300, one or more cables having various different lengths, and one or more of the stands 316.

From all that has been said, it will be clear that there has thus been shown and described herein a charger extension device which fulfills the various advantages sought therefore. It will become apparent to those skilled in the art, however, that many changes, modifications, variations, and other uses and applications of the subject charger extension device are possible and contemplated. All changes, modifications, variations, and other uses and applications which do not depart from the spirit and scope of the disclosure are deemed to be covered by the disclosure, which is limited only by the claims which follow.

What is claimed is:

1. A charger extension device comprising:
    a housing having a top side, a left side, a bottom side, a right side, a rear side, and a front side with the front side having a catch;
    a pivot pin;
    an USB port on the front side of the housing;
    a port on the rear side of the housing; and
    a cable retention assembly on the front side of the housing comprising a generally U-shaped body having a first leg having an end having a hook portion for engaging the catch, a second leg having an end separate from the end of the first leg, a central portion having an aperture formed therein for receiving the pivot pin for pivoting the central portion relative to the front side of the housing, and a slot formed between the legs and the central portion and open between the separate ends.

2. The charger extension device of claim 1 further comprising a cable having an USB connector end and a connector end.

3. The charger extension device of claim 1 further comprising a second USB port on the front side of the housing.

4. The charger extension device of claim 3 further comprising a second cable retention assembly on the front side of the housing comprising a generally U-shaped body having a first leg having an end, a second leg having an end separate from the end of the first leg, a central portion having an aperture formed therein, and a slot formed between the legs and the central portion and open between the separate ends.

5. The charger extension device of claim 1 further comprising a second USB port on the front side of the housing with the second USB port being a Micro-USB type port.

6. The charger extension device of claim 1 wherein the USB port is an USB-C type port.

7. The charger extension device of claim 1 wherein the USB port has four pin connections and the rear side port has eight pin connections and two of four pin connections of the USB port are connected to two of the eight pin connections of the rear side port.

8. The charger extension device of claim 1 wherein the USB port is an USB-B type port.

9. A charger extension device comprising:
    a housing having a top side, a left side, a bottom side, a right side, a rear side, and a front side with the front side having a catch;
    a pivot pin;
    an USB port on the front side of the housing;
    a cable retention assembly on the front side of the housing comprising a generally U-shaped body having a first leg having an end, a second leg having an end separate from the end of the first leg and having an end having a hook portion for engaging the catch, a central portion having an aperture formed therein for receiving the pivot pin for pivoting the central portion relative to the front side of the housing, and a slot formed between the legs and the central portion and open between the separate ends; and
    a port on the rear side of the housing.

10. The charger extension device of claim 9 wherein the first leg has an end having a hook portion.

11. The charger extension device of claim 10 wherein the front side has a second catch portion for retaining the hook portion of the first leg.

12. The charger extension device of claim 9 further comprising a second cable retention assembly on the rear side of the housing comprising a generally U-shaped body having a first leg having an end having a hook portion, a second leg having an end separate from the end of the first leg, a central portion having an aperture formed therein, and a slot formed between the legs and the central portion and open between the separate ends.

13. The charger extension device of claim 12 further comprising a pivot pin for insertion into the aperture formed in the central portion of the second cable retention assembly.

14. The charger extension device of claim 12 wherein the second leg further comprises an end having a hook portion.

15. The charger extension device of claim 9 wherein the USB port is an USB-B type port.

16. A charger extension device comprising:
    a housing having a top side, a left side, a bottom side, a right side, a rear side, and a front side having a catch;
    an USB port on the front side of the housing;
    a port on the rear side of the housing;
    a cable retention assembly on the front side of the housing comprising a generally U-shaped body having a first leg having an end having a hook portion for engaging the catch, a second leg having an end separate from the end of the first leg, a central portion having an aperture formed therein for receiving the pivot pin for pivoting the central portion relative to the front side of the housing, and a slot formed between the legs and the central portion and open between the separate ends;
    an L shaped stand for positioning on the right side of the housing and the bottom side of the housing, the L shaped stand having a side engaging edge; and
    a slot formed in the right side of the housing for receiving therein the side engaging edge of the L shaped stand.

17. The charger extension device of claim 16 wherein the L shaped stand has a bottom engaging edge.

18. The charger extension device of claim 17 further comprising a second slot formed in the right side of the housing for receiving the L shaped stand.

19. The charger extension device of claim 16 further comprising a second L shaped stand for positioning on the right side of the housing and the bottom side of the housing.

20. The charger extension device of claim 16 further comprising a second USB port on the front side of the housing.

* * * * *